(No Model.)
G. A. BRACHHAUSEN & P. RIESSNER.
MUSIC BOX.
No. 500,371. Patented June 27, 1893.
Fig. 1.
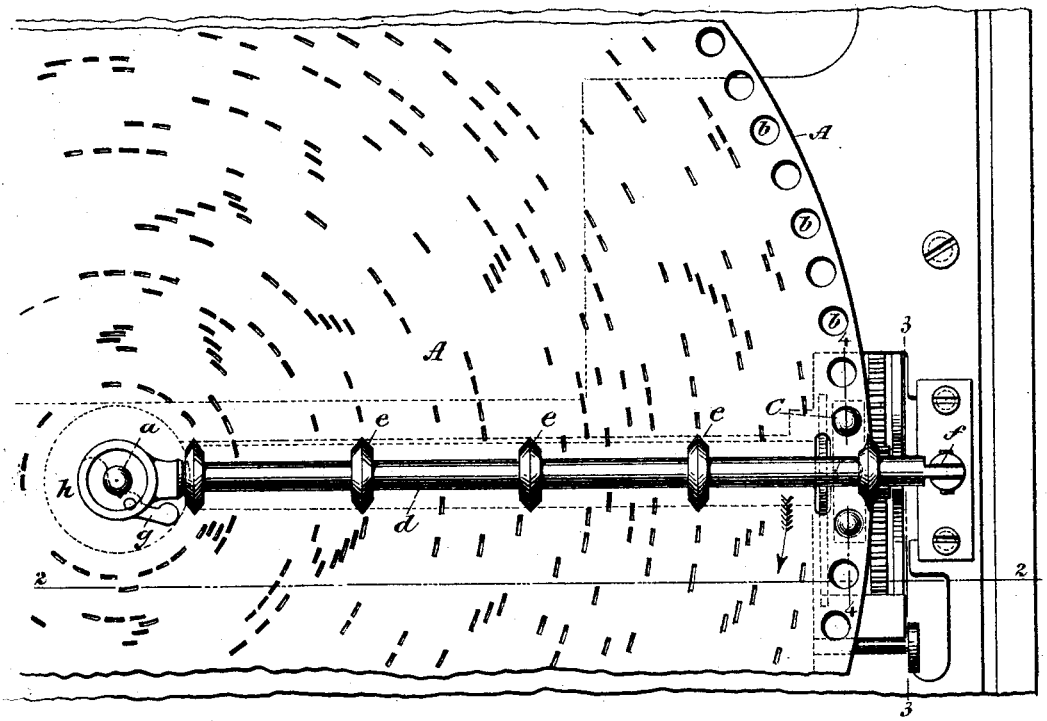
Fig. 2.
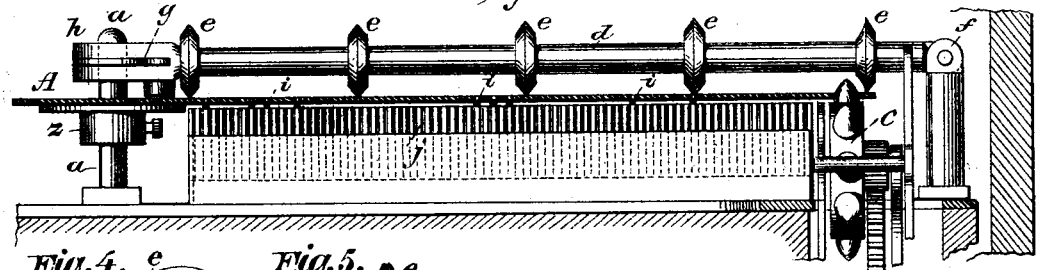
Fig. 4.    Fig. 5.
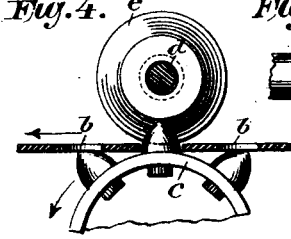 
Fig. 3.
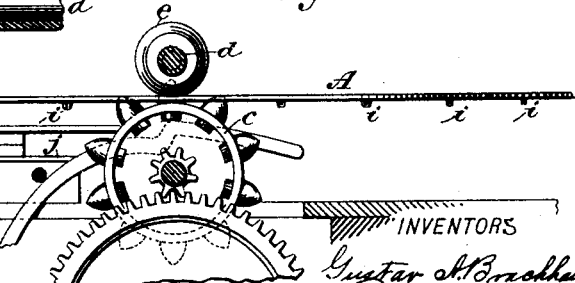
WITNESSES:
Gustave Dieterich
L. M. Hachenlager
INVENTORS
Gustav A. Brachhausen
Paul Riessner
BY Briesen & Knauth
ATTORNEYS.

UNITED STATES PATENT OFFICE.

GUSTAV A. BRACHHAUSEN, OF HOBOKEN, NEW JERSEY, AND PAUL RIESSNER, OF EUTRITZSCH, NEAR LEIPSIC, GERMANY.

MUSIC-BOX.

SPECIFICATION forming part of Letters Patent No. 500,371, dated June 27, 1893.

Application filed December 19, 1892. Serial No. 455,591. (No model.)

*To all whom it may concern:*

Be it known that we, GUSTAV ADOLF BRACHHAUSEN, residing at Hoboken, in the county of Hudson and State of New Jersey, and PAUL RIESSNER, residing at Eutritzsch, near Leipsic, in the Kingdom of Saxony and German Empire, have invented certain new and useful Improvements in Music-Boxes, of which the following is a full, clear, and exact description, reference being had to the accompanying drawings, in which—

Figure 1 is a top view of a portion of a music-box illustrating our invention. Fig. 2 is a vertical section on the line 2—2 of Fig. 1. Figs. 3, 4 and 5 are enlarged detail views of portions of our improved music-box.

Our invention relates to that class of music-boxes wherein disks or rotary note-plates are used to operate the vibrating tongues, and consists in the novel arrangement and combination of parts hereinafter described and specifically pointed out in the claims.

Heretofore in this class of instruments rotary note-plates or disks have been driven from a shaft located in the central portion thereof, which shaft was operated by suitable mechanism. This was objectionable for many reasons; the motion imparted by the shaft located as above described was jerky and unsteady, which is a serious disadvantage in this character of devices; it required, in music-boxes built upon a large scale, that the power for rotating the disk be very great and it was found difficult to operate the disk to the slight degree often required.

The object of our invention is to provide a simple device which with comparatively little power will rotate the disk in a steady positive manner and to the smallest degree when necessary.

In the drawings, A represents a music-plate or disk which is adapted to turn or rotate upon a suitable pin or pivot $a$ and is removable therefrom, the adjustable sleeve $z$ acting to support said disk thereon. At or near the outer edge of this music-plate, the same is provided with a series of apertures or depressions $b$ into which the teeth of a sprocket-wheel $c$ are adapted to fit, said sprocket-wheel being connected to and driven by a suitable train of gear.

$d$ is a rod which carries loosely mounted friction-wheels $e$ and is hinged at its outer end to a stationary support, as shown at $f$, and provided at the inner end with a perforated enlargement $h$, which is able to fit over the pin $a$, being locked to a notch in said pin by a latch $g$. When thus locked the wheels $e$ are above and in contact with the outer face of the disk A.

When it is desired to replace the note-plate A by another adapted to play different tunes, it is merely necessary to unfasten the latch $g$, throw back the rod $d$ on its hinge $f$, lift off the note-plate A, and substitute another, whereupon the rod $d$ is refastened so that its friction-rollers $e$ will bear on the top of the note-plate A. These rollers $e$ prevent the note-plate from vibrating, and insure contact between the projecting pins $i$ or actuating edges thereon and the vibrating tongues $j$ or the mechanism for vibrating them, the music-box being then in condition to be operated. It will be seen that the rod $d$ with its rollers bears on that radius of the disk A which extends to the sprocket-wheel. In the same radius the disk affects the tongues $j$. Hence the rod $d$ holds the disk steady where it plays and holds it on the sprocket-wheel. Should there be occasion for the use of series of such rods $d$, the same can readily be used.

Having described our invention, what we claim is—

1. In a music-box the combination of the disk A, having apertures $b$ near the outer edge and having playing edges $i$, with the sprocket-wheel $c$ adapted to engage in said apertures $b$, and means substantially as described for holding the disk down by pressure from above, substantially as and for the purpose specified.

2. The combination of the disk A, means substantially as described for rotating said disk from the outer part thereof, rod $d$ and friction-wheels $e$ mounted thereon and adapted to bear upon the outer face of said disk A, substantially as described.

3. The combination of the disk A provided with apertures $b$ near the outer edge thereof, sprocket-wheel *c* adapted to engage in said apertures, central pin *a* and adjustable sleeve *z* for supporting said disk A, and upper bar *d* having friction-wheels *e*, all arranged substantially as and for the purposes set forth.

4. The combination of the disk A provided with apertures *b* near the outer edge, with sprocket-wheel *c* adapted to engage in said apertures and rotate the disk, hinged rod *d*, friction-wheels *e* hung thereon and adapted to bear upon said disk A, central pin *a* a[nd] latch *g*, substantially as described.

GUSTAV A. BRACHHAUSEN.
    PAUL RIESSNER.

Witnesses to Gustav A. Brachhausen:
  HARRY M. TURK,
  OTTO SCHRENK.

Witnesses to Paul Riessner:
  CARL BORNGRABER,
  EMIL VOIGTLAENDER.